United States Patent [19]

Tsai

[11] 4,375,236
[45] Mar. 1, 1983

[54] REGENERATOR FLOW DISTRIBUTION BY MEANS OF AIR JETS

[75] Inventor: Yih W. Tsai, O'Hara Township, Allegheny County, Pa.

[73] Assignee: PPG Industries, Inc., Pittsburgh, Pa.

[21] Appl. No.: 305,242

[22] Filed: Sep. 24, 1981

[51] Int. Cl.³ .............................................. F28D 17/04
[52] U.S. Cl. ...................................... 165/1; 165/9.3; 432/181
[58] Field of Search .............................. 165/1, 9.3, 9.4; 432/180, 181, 182, 165

[56] References Cited

U.S. PATENT DOCUMENTS

| | | | |
|---|---|---|---|
| 296,174 | 4/1884 | Jones | 432/181 |
| 1,836,412 | 12/1931 | Trinks | |
| 1,914,956 | 6/1933 | Naismith et al. | 432/165 |
| 2,491,705 | 12/1949 | Bloom | 432/181 X |
| 2,813,708 | 11/1957 | Frey | |
| 4,047,560 | 9/1977 | Tsai | |
| 4,088,180 | 5/1978 | Tsai | |
| 4,174,948 | 11/1979 | Bradley et al. | |
| 4,256,173 | 3/1981 | Tsai et al. | |
| 4,257,476 | 3/1981 | Tsai | |
| 4,298,372 | 11/1981 | Stover et al. | |

FOREIGN PATENT DOCUMENTS 246243 4/1912 Fed. Rep. of Germany ...... 432/180

Primary Examiner—Albert W. Davis, Jr.
Attorney, Agent, or Firm—Dennis G. Millman

[57] ABSTRACT

In a regenerative furnace of the type used for melting glass, localized overheating of the regenerator packing is minimized, heating of the regenerator packing is made more uniform, and regenerator efficiency is improved by employing air jets in the space alongside the regenerator packing opposite the flue to counteract flow imbalances in the regenerator.

14 Claims, 7 Drawing Figures

REGENERATOR FLOW DISTRIBUTION BY MEANS OF AIR JETS

BACKGROUND OF THE INVENTION

This invention relates to regenerative furnaces and their operation and, in particular, to the type of regenerative furnace commonly employed in the manufacture of flat glass. The regenerators used in such furnaces are usually comprised of a gas pervious bed of refractory material, such as a stacked arrangement of bricks sometimes called "checker packing," through which hot exhaust gases are passed during one phase of a firing cycle in order to heat the packing. In the alternate phase of the firing cycle, the flow is reversed and the heat stored in the packing serves to preheat combustion air passing through the regenerator. The regenerators are generally employed in pairs with one on either side of the combustion chamber of the furnace. While one regenerator is absorbing heat from the exhaust gas, the other is heating incoming air.

Because flat glass furnaces typically include a relatively large number of burner ports (usually about 4–8 on each side) spaced several feet apart from one another in a row, the length of a regenerator bed associated therewith usually has a length which is several times greater than its height or width. Because of construction expediencies, the main flue carrying gases to and from each regenerator is usually located at one end of the regenerator. This arrangement unfortunately results in a tendency of gases in portions of the regenerators to flow longitudinally and to by-pass portions of the packing. Hot exhaust gases tend to flow in greater amounts through the portions of the packing near the flue, causing those portions to become hotter than other portions of the packing. This unbalanced condition is aggravated by the fact that the flow of cool, incoming combustion air during the firing phase tends to be biased toward the opposite end of the packing from the flue inlet. As a result, the flue end portion of the packing tends to reach higher peak temperatures as well as maintaining higher minimum temperatures over the firing cycle. Because of the high temperatures, the flue end portion of the packing tends to deteriorate faster than others, thereby shortening furnace life and often acting as a restriction on the operation of a furnace. Furthermore, because the stored heat is concentrated in one portion of the packing, the efficiency with which air is preheated during the firing phase is reduced, thereby reducing the overall thermal efficiency of the furnace. It is an object of the present invention to overcome these disadvantages.

U.S. Pat. No. 1,836,412 and 2,813,708 relate to modifying flow patterns in regenerators. Both employ rigid baffles designed primarily for the purpose of rendering the air flow through the checker packing more uniform during the firing phase. It is not apparent, however, how such arrangements could sufficiently influence flow in the opposite direction through the packing during the exhaust phase to avoid concentrating heat at the flue end of the packing. Moreover, such baffle arrangements could change the gas flow pattern in the space beneath the packing during the exhaust phase, thereby promoting lateral flow of exhaust gases along the space above the packing and then into the packing at the flue end.

Arrangements in which a plurality of flues are provided to distribute gas flows through regenerators are disclosed in U.S. Pat. Nos. 4,174,948; 4,256,173; and 4,257,476. Each of these arrangements requires a substantial rebuilding of the regenerator structure, which may not be practical for existing furnaces and is unsuitable for furnaces that are currently operating continuously. Furthermore, it would be desirable if flow distribution could be achieved without the substantial additional structure required by these arrangements.

In U.S. Pat. Nos. 4,047,560 and 4,088,180 there is shown a movable baffle for diverting air flows during the firing phase of a regenerator. It would be preferred to avoid the use of movable parts, particularly in such a harsh environment where durability can be a problem.

It is also known to provide regenerators with partitions so that each burner port is associated with a corresponding regenerator packing section. While such an arrangement can provide positive control of flow distribution, its use is discouraged by the fact that plugging or collapse of one of the regenerator packing sections can essentially remove a burner port from service, thereby severely crippling the operation of a furnace. For these reasons, it is preferred to employ a unitary, unpartitioned bed of packing in common communication with a plurality of burner ports.

SUMMARY OF THE INVENTION

In the present invention, gas flows in a regenerator are made more uniform by employing air jet means, or the like, to counteract longitudinal flow tendencies in the gas distributing space joining a flue to a bed of packing. The air jet is located near the opposite end of the packing from the flue and is directed along the length of the regenerator substantially parallel to the adjacent side of the packing. Air, or other relatively cool gas, issuing from the jet is directed countercurrent to the undesired longitudinal flow through the distributing space during the firing phase of the firing cycle and, as a result, directly impedes this longitudinal flow so that combustion air passes more uniformly through the packing. During the exhaust phase, entrainment of gases by the air jet in the region opposite the flue end of the distributing space produces a low pressure zone that induces greater amounts of exhaust gas to be drawn through the adjacent portion of the packing and correspondingly diminishes the amount of exhaust gas passing longitudinally along the plenum to the flue end of the packing.

Advantageously, the flow control means of the present invention can be added readily to an existing operating furnace with no disruption of operation and at relatively low cost. The cost of operating the flow control jets is minor compared to the improved regenerator efficiency and prolonged furnace life obtainable with the present invention. Additionally, the use of relatively cool jets of air or the like also serves to reduce overheating of the packing support structure directly by reducing the temperature of the distributing space.

The subject matter of this invention is related to that of concurrently filed U.S. patent application Ser. No. 305,241 filed Sept. 24, 1981, of Yih-Wan Tsai entitled "Regenerator Flow Distribution by Means of a Burner."

THE DRAWINGS

DETAILED DESCRIPTION

Figure 1:
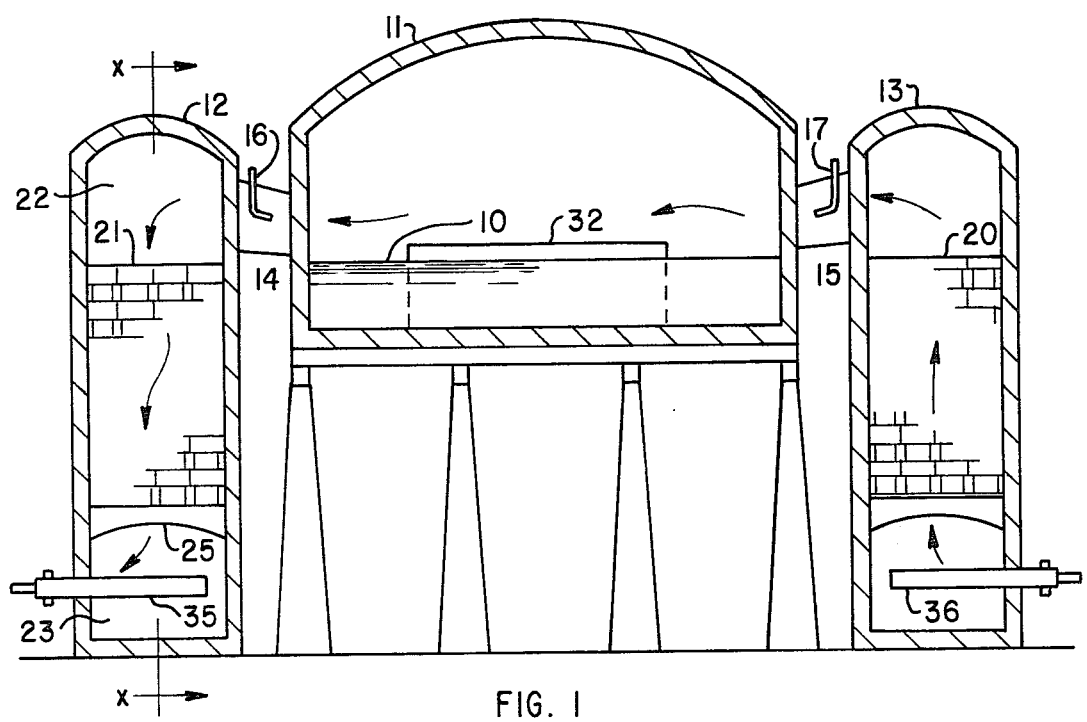
FIG. 1 is a schematic, transverse, vertical section across the width of a cross-fired, regenerative, glass melting furnace, showing an example of flow control air jet placement in accordance with the present invention.

The regenerative furnace shown in the drawings is typical of melting furnaces used in the flat glass industry. It should be understood that such a furnace is being described as an illustrative example and that the invention is applicable to regenerative furnaces of other types.

In FIG. 1 a pool of molten and partially melted glass 10 is contained in a melter 11, the interior of which is the main combustion chamber of the furnace. The furnace also includes a pair of regenerators 12 and 13 flanking the melter and which communicate with the melter by means of a respective plurality of burner ports 14 and 15. Fuel for combustion is supplied by fuel lines 16 and 17, respectively, to burners within each port. As shown in FIG. 1, the regenerator 12 is in the exhaust phase of the firing cycle and the regenerator 13 is in the firing phase of the firing cycle. Air for combustion passes upwardly through regenerator 13 where it is preheated by passing over a previously heated, gas-pervious brickwork checker packing 20 made of refractory materials, and then passes through ports 15 where it combines with fuel from fuel line 17 at the mouth of each port. Flames issue a considerable distance into the interior of the melter 11 and hot exhaust gases pass through ports 14 and into the opposite regenerator 12 where the exhaust gases heat another brickwork checker packing 21. Fuel line 16 is inoperative during this portion of the firing cycle. After several minutes of operation the flows are reversed, fuel is supplied through lines 16, and fuel lines 17 are inactivated. During this second phase of the firing cycle, regenerator 12 serves to preheat incoming combustion air and regenerator 13 serves to capture waste heat from the exhaust gases passing therethrough. After several more minutes of operation, the direction of flow is again reversed, and so on.

Structurally, the regenerators 12 and 13 may essentially be mirror images of each other and, therefore, the description of additional structural features of regenerator 12 herein applies to regenerator 13 as well. Typical of glass melting furnace regenerators is the geometry wherein the width of the bed of packing, as shown in FIG. 1, is considerably less than its length, as shown in FIGS. 2–5. This is due to the fact that each regenerator is in communication with an elongated row of ports, typically 4 to 8 ports on each side of the furnace. Above the packing 21 is an elongated plenum 22 by way of which each of the ports 14 are in common communication with the packing 21. At the opposite side of the packing is a gas distributing space 23 which opens at one end to a flue 24 (FIGS. 2–5). The packing is supported by a series of arches 25.

In FIGS. 2–5 there is shown a schematic representation of the feeding means for the melter 11. This includes an inlet extension portion 30 of the melter, glass batch feeding means 31, and an inlet opening 32.

Figure 2:
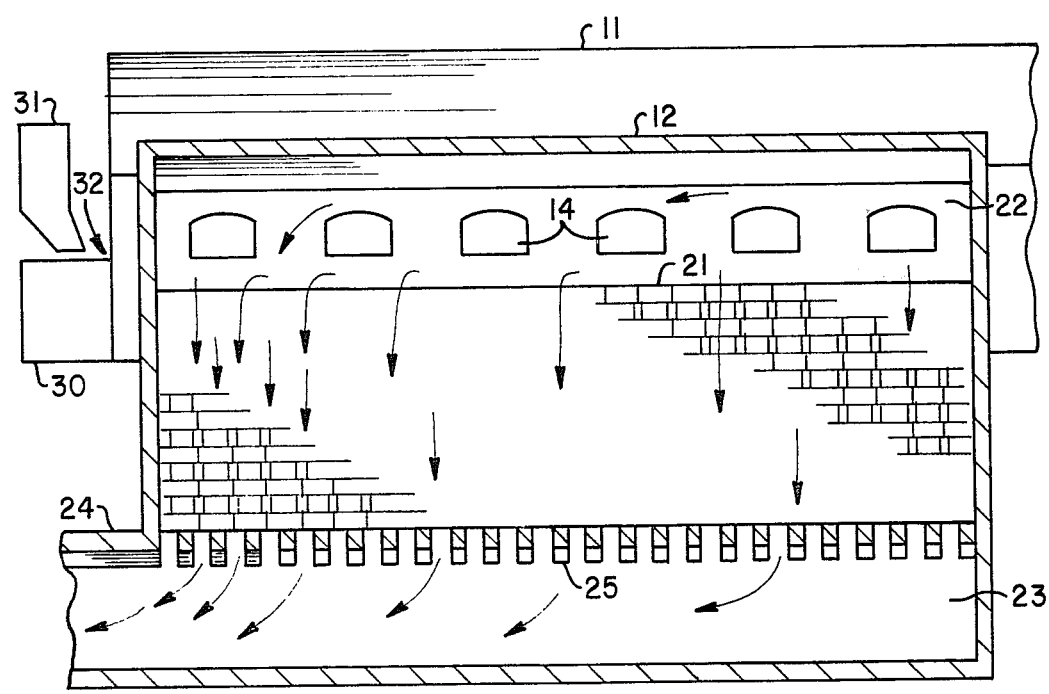
FIG. 2 is a vertical, longitudinal section of a regenerator taken along line x—x in FIG. 1, showing a typical flow pattern during an exhaust phase of the regenerator without the flow control means of the present invention.
Figure 3:
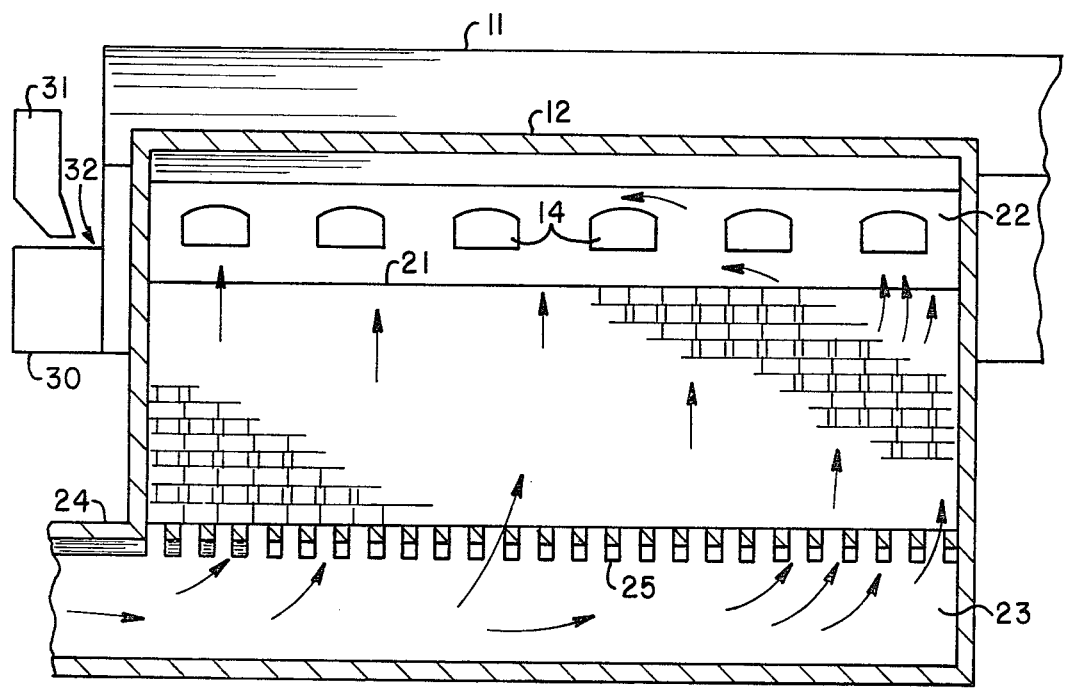
FIG. 3 is a vertical, longitudinal section of the same regenerator taken along line x—x in FIG. 1, showing a typical flow pattern during a firing phase without the flow control means of the present invention.

FIG. 2 depicts an approximation of the flow pattern during an exhaust phase of the firing cycle without the improvements of the present invention. A portion of the exhaust gases tend to be drawn longitudinally along the plenum 22 toward the flue end of the regenerator and then down into the packing near the flue end. The resulting greater amount of exhaust gases flowing through the flue end of the packing causes that portion of the packing and the underlying arches 25 to become hotter than the remainder of the regenerator. When the flows are reversed in the firing phase as shown in FIG. 3, the flow of incoming air through the packing, and therefore the cooling effect, has been found to be somewhat biased toward the opposite end of the packing from the flue. As a result, the packing near the flue end has been found to remain continually at a higher temperature than the rest of the packing. The region of this inefficient and, sometimes, harmful concentration of heat is, of course, not discrete and depends upon the particular configuration of a regenerator, but it can be said to consist generally of about the first one third of the packing from the flue end. Specific data showing an example of the thermal imbalance within this type of regenerator are set forth in U.S. Pat. No. 4,047,560 and are incorporated herein by reference.

Figure 4:
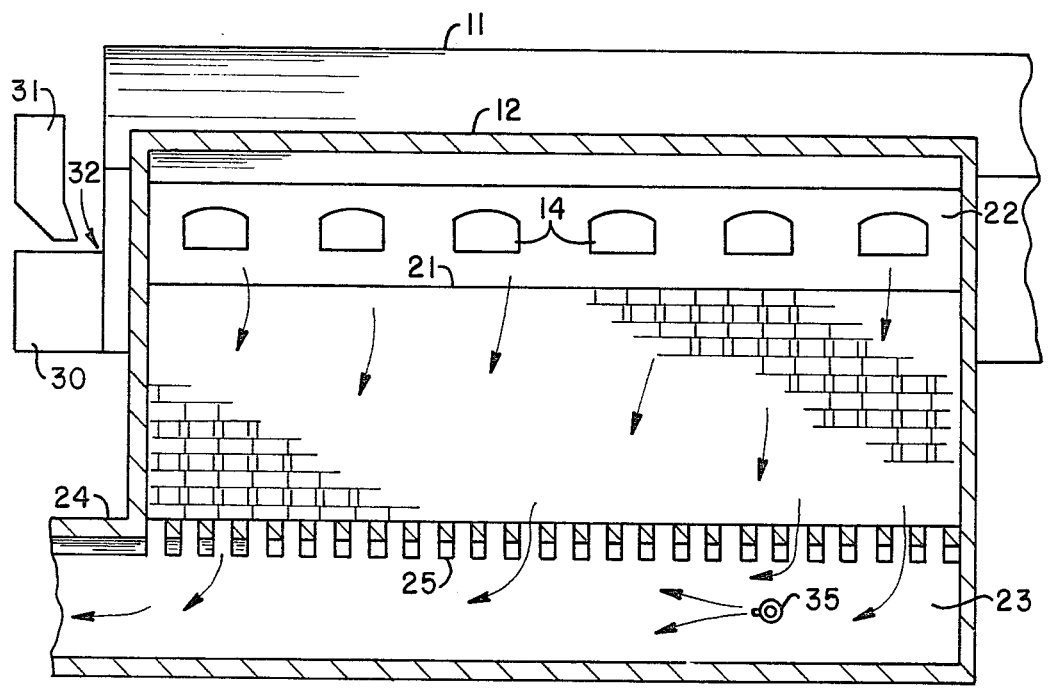
FIG. 4 is the same view of the regenerator shown in FIG. 2, showing the flow pattern during an exhaust phase with a flow control air jet operating in accordance with the present invention.

In FIG. 4 there is shown a flow control air jet pipe 35 inserted into the distributing space 23 of the regenerator 12 in accordance with a preferred embodiment of the present invention. FIG. 4 illustrates the approximate effect of the flow control air jet on the exhaust gas flow pattern through the packing 21 during the exhaust phase, which may be compared with that of FIG. 2. The jets of air from the pipe 35 are directed substantially parallel to the length of the distributing space toward the flue end thereof. The jets preferably are located in the half of the distributing space 23 farthest from the flue 24, optimally in the farthest one third. The jets issuing from the pipe 35 produce an entrainment effect on the surrounding gases, thereby creating a low pressure zone in the adjacent portion of the packing. This low pressure zone induces greater flow rates of exhaust gas down through the packing at the opposite end from the flue, thereby diminishing the tendency of the exhaust gas to flow along the plenum 22 toward the flue end of the packing as shown in FIG. 2.

Figure 5:
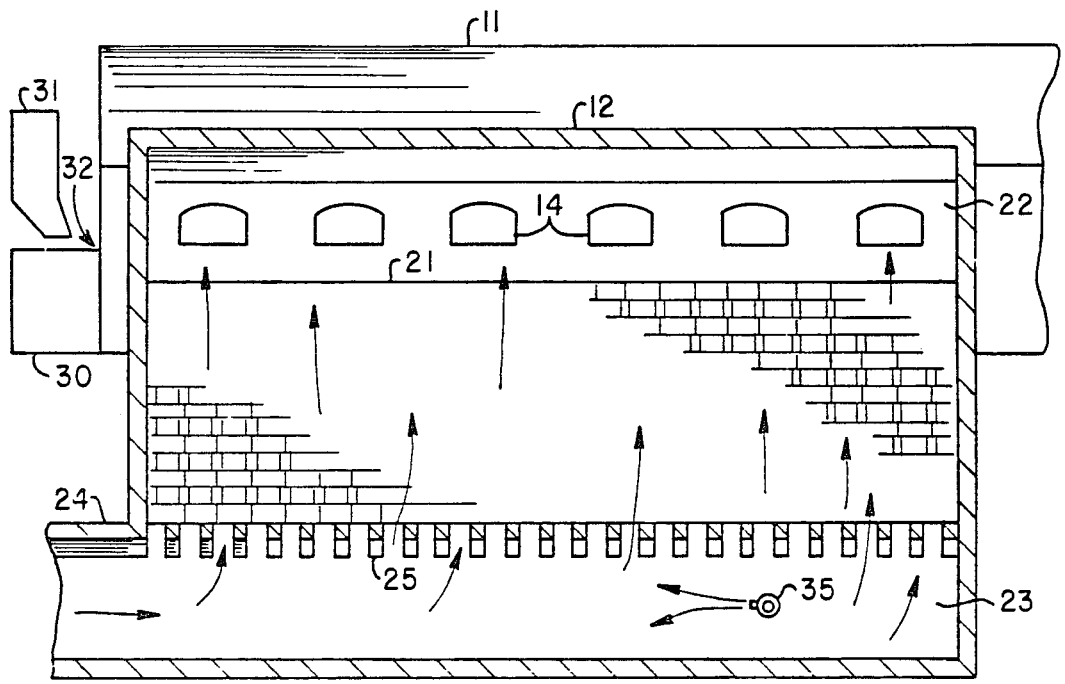
FIG. 5 is the same view of the regenerator shown in FIG. 3 showing the flow pattern during a firing phase with a flow control air jet operating in accordance with the present invention.

In FIG. 5, an approximate representation is shown of the effect of the flow control jets on the distribution of incoming combustion air through the regenerator during the firing phase, which may be compared to the flow pattern shown in FIG. 3. The tendency for combustion air entering from the flue 24 to flow disproportionately to the far end of the distributing space 23 is counteracted by the air jets from pipe 35 which are directed countercurrent to the flow of incoming combustion air along the distributing space. The flow resistance created by the jets causes larger amounts of combustion air to pass through portions of the packing at the flue end of the regenerator, thereby resulting in a more evenly distributed flow of air through all portions of the packing and a reduction of the temperature difference between the flue end of the regenerator and the opposite end.

The air jets have the twofold effect of avoiding excessive flow rates of exhaust gases through the flue end of the packing and of inducing greater flow rates of cool, incoming air through the flue end of the packing, both of which tend to diminish the tendency of the flue end packing to overheat. Furthermore, by inducing greater amounts of incoming air to flow through the hotter portions of the packing, the effectiveness of heat recovery by the regenerator is improved. These dual benefits entail operating the air jets during the entire, or substantially the entire, firing cycle, which is preferred. However, the beneficial effects on the exhaust phase and the firing phase are independent from one another, and if desired, the air jets may be operated during only one of the phases to attain part of the advantages of the invention.

It is also believed that the flow control means may have some direct beneficial effect on the packing support arches 25 and associated structure, in that the streams of air from the air jets may cool the arches, thereby lengthening their lifespan.

In most cases it would be preferred to employ a second flow control air jet pipe 36 in the other regenerator 13, but it is, of course, not essential that the invention be applied to both regenerators. Instead of a single air jet pipe in the plenum of each regenerator, it may be preferred in some cases to employ two or more pipes in each to distribute the counterflow effect over a wider area. One or more jet orifices may be provided in each pipe. For example, three orifices as used in the specific embodiment to be disclosed have been found satisfactory to distribute the effect of the air jets over a wider area of the distributing space. It has been found suitable to locate the air jet pipe approximately midway between the support arches 25 and the floor of the distributing space. The location of the air jet pipe along the length of the distributing space should be at the opposite end from the flue entrance, within the farthest half of the distributing space, and preferably the farthest one third. For example, in a six port regenerator as shown in the drawings, the pipe is advantageously located in the region aligned with the last two ports.

Figure 6:
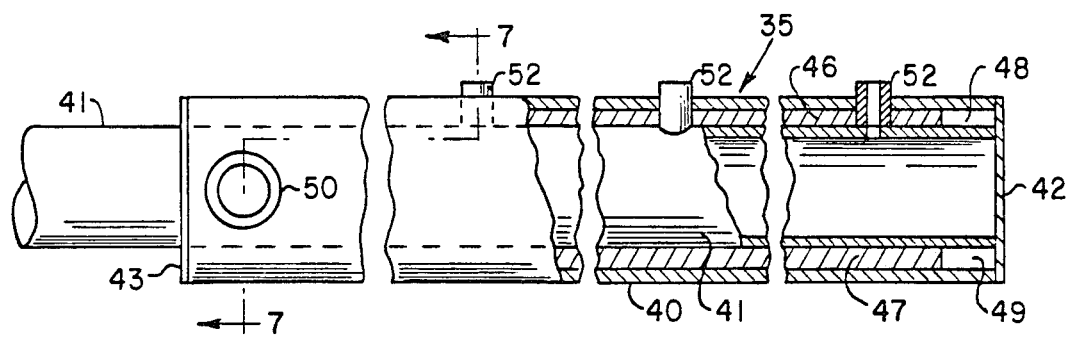
FIG. 6 is an enlarged elevational view, partly broken away, of a preferred construction of air jet for use in the present invention.
Figure 7:
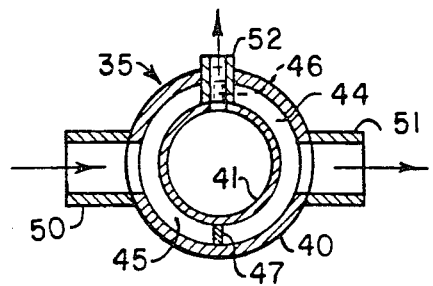
FIG. 7 is a cross-sectional view of the air jet structure of FIG. 6, taken along line 7—7 in FIG. 6.

Details of the one embodiment of air jet pipe 35 are shown in FIGS. 6 and 7. Because of the hot environment in the air distributing space it is preferred that the air jet pipe be cooled, thus the embodiment shown in FIGS. 6 and 7 is a double jacketed, water cooled arrangement. The assembly comprises an outer cylindrical conduit 40 and an inner cylindrical conduit 41, both of which terminate at an end plate 42. The outer conduit 40 is shorter than the inner conduit 41 and the other end of the conduit 40 is closed by a ring 43, thereby creating an annular space between the inner and outer conduits. The annular space is divided into two halves 44 and 45 by means of partitions 46 and 47. The partitions 46 and 47 terminate short of the end plate 42 so as to leave openings 48 and 49 through which the annular halves 44 and 45 communicate with one another. By way of a coupling 50, the half annular space 44 may be connected to a source of water which may flow the length of the space 44 and into space 45 through openings 48 and 49 and then may drain from space 45 by way of a coupling 51. Thus, the outer conduit 40 acts as a water jacket to protect the inner conduit 41 which carries compressed air for the air jets. In the arrangement shown, three nozzle tubes 52 extend through the outer conduit 40 into communication with the interior of the inner conduit 41. Compressed air from the interior of conduit 41 escaping through the tubes 52 constitutes the flow control air jets. The air jet pipe may be constructed of carbon steel if sufficient water cooling is provided, but stainless steel or other heat resistant alloy may be preferred. In the latter case, water cooling may be dispensed with, and the metal may be protected by a coating of ceramic insulation material. In an alternate water cooled arrangement, two annular spaces may be provided for the flow of coolant, with flow toward the end in one annulus and returning through the other annulus.

The air jet nozzle diameter, air pressure, volume flow rate, and velocity are all interrelated. In general, high velocity is more effective than large volume, and therefore, at a given pressure, smaller diameter nozzles are preferred. However, a nozzle diameter that is too small can render the air jet ineffective by unduly restricting the volume flow rate of air. For example, nozzles having inside diameters of 0.375 inches (9.5 millimeters) were found to provide insufficient flow of air at 80–100 pounds per square inch (14,000 to 17,500 newtons per square meter) air pressure. In the 80–100 pounds per square inch pressure range, which is typical of compressed air line pressure available at a manufacturing plant, nozzles having inside diameters of 0.4 to 1.0 inch (10–25 millimeters) may be suitable, nozzles having 0.5 inch (12.7 millimeters) inside diameters being preferred. If unduly large nozzles are employed, the volume flow rate is increased, but the velocity is reduced, thereby reducing the effectiveness of the air jet. Velocity can be increased with a large diameter nozzle by employing greater air pressures, but the resultant increased volume flow rate may be greater than desired. Unduly large volume flow rates are preferably avoided so as to minimize disturbance to the overall furnace operation and to avoid the need for large amounts of compressed air. It has been found that adequate flow control can be attained with a volume of compressed air less than 1% of the total combustion air volume throughput of the furnace and in some cases, may require as little as 0.2%. A typical preferred range is 0.2% to 0.7%. With the above guidelines, the air jet velocity typically will be greater than about 100 feet per second (30 meters per second) and preferably greater than 300 feet per second (90 meters per second). In order to achieve the desired volume flow rate, the air pressure at the nozzles may be reduced below 80 pounds per square inch by means of a valve in the air supply line. A specific preferred mode employs three nozzles on a pipe of the construction shown in FIGS. 6 and 7, each having an inside diameter of 0.5 inches (12.7 millimeters) through which air flows at 7,000–8,000 cubic feet per hour (200–230 cubic meters per hour) at a velocity of approximately 400 feet per second (120 meters per second) wherein the total flow rate of the three jets constitutes about 0.5% of the combustion air throughput to the furnace.

The following table sets forth the effect on regenerator temperatures by an air jet installation having the parameters of the specific preferred mode described above, except that the total volume flow rate of the air jets was 11,500–13,000 cubic feet per hour (325–370 cubic meters per hour). The furnace was a six port design as shown in the drawings and packing temperatures were measured by thermocouples located slightly above the packing support arches 25. The table shows temperature readings at three locations along the length of the packing at locations in vertical alignment with the second, fourth, and sixth ports, respectively, from the flue end. The temperatures are the average peak temperatures of the brick at each location prior to deployment of the air jets, one hour twenty minutes after startup of the air jets, and two hours fifty minutes after startup of the air jets. In this case, use of the air jets was terminated after about seven hours because of an overcompensating effect on the regenerator packing temperature distribution.

| | Peak Packing Temperatures | | |
|---|---|---|---|
| | Without air jets | 1 hr. 20 min. after air jets | 2 hr. 50 min. after air jets |
| Port 2 | 1945° F. (1068° C.) | 1900° F. (1038° C.) | 1850° F. (1010° C.) |
| Port 4 | 1740° F. ( 949° C.) | 1735° F. ( 946° C.) | 1710° F. ( 932° C.) |
| Port 6 | 1525° F. ( 829° C.) | 1570° F. ( 854° C.) | 1610° F. ( 877° C.) |
| Temperature Difference Port 2-Port 6 | 420° F. ( 239° C.) | 330° F. ( 184° C.) | 240° F. ( 133° C.) |

Specific embodiments have been described herein in order to disclose the best mode of practicing the invention, but it should be understood that other variations and modifications as are known to those in the art may be resorted to without departing from the scope of the invention defined by the claims which follow.

I claim:

1. A method of operating a regenerator of the type which includes a gas pervious bed of refractory material, a gas distributing space communicating with the bed along its length at one side, a flue communicating with the gas distributing space at one end thereof, a plenum communicating with the bed along its length at the opposite side of the bed from the distributing space, a plurality of ports opening onto the plenum at spaced apart locations along the length of the plenum and communicating with a combustion furnace, wherein the regenerator participates in a periodically reversing firing cycle including an exhaust phase in which hot exhaust gases pass from the furnace through the ports into the plenum and then through the bed to the distributing space and out of the regenerator through the flue, and a firing phase wherein incoming combustion air enters the regenerator through the flue and then passes from the distributing space through the bed to the plenum and then to the furnace by way of the ports; the improvement comprising directing a gaseous jet along the distributing space in the direction of the flue end of the distributing space to maintain a more uniform distribution of flows through the bed.

2. The method of claim 1 wherein the jet operates during the exhaust phase and is directed cocurrent with the exhaust gas flow through the distributing space so as to entrain exhaust gas passing from the portion of the bed at the opposite end of the regenerator from the flue.

3. The method of claim 1 wherein the jet is operated during the firing phase and is directed countercurrent to combustion air passing through the distributing space so as to impede passage of combustion air into the portion of the bed at the opposite end of the regenerator from the flue.

4. The method of claim 3 wherein the jet additionally operates during the exhaust phase and is directed cocurrent with the flow of exhaust gas through the distributing space so as to entrain exhaust gas passing from the portion of the bed at the opposite end of the regenerator from the flue.

5. The method of claim 1 wherein the jet is discharged into the distributing space from a nozzle located within the opposite half of the distributing space length from the flue.

6. The method of claim 1 wherein the jet is discharged into the distributing space from a nozzle located within one third of the length of the distributing space at the opposite end from the flue.

7. The method of claim 1 wherein the jet discharges a volume of gas no greater than one percent of the total volume of combustion air passed to the furnace.

8. The method of claim 7 wherein the gas discharged from the jet is air.

9. The method of claim 1 wherein the volume of gas discharged by the jet is 0.2–0.7% of the volume flow rate of combustion air passed through the furnace.

10. The method of claim 1 wherein a plurality of jets are directed along the distributing space in the direction of the flue end of the distributing space to maintain a more uniform distribution of exhaust gas flow through the bed.

11. The method of claim 10 wherein the total volume of gas issuing from the jets is no greater than one percent of the volume flow rate of combustion air passed to the furnace.

12. The method of claim 10 wherein the total volume of gas issuing from the jets is 0.2–0.7% of the volume flow rate of combustion air passed to the furnace.

13. The method of claim 1 or 10 wherein one or more of the jets issues from a nozzle having an inside diameter of 0.4–1.0 inch (10–25 millimeters).

14. The method of claim 1 or 10 wherein the jet velocity is at least 100 feet per second (30 meters per second).

* * * * *